INFORMATION STORAGE SYSTEM

Filed July 21, 1964 2 Sheets-Sheet 1

INVENTORS R. S. GAINES
C. Y. LEE
BY R. C. Winter
ATTORNEY

INFORMATION STORAGE SYSTEM

Filed July 21, 1964

2 Sheets-Sheet 2

United States Patent Office 3,475,733
Patented Oct. 28, 1969

3,475,733

INFORMATION STORAGE SYSTEM

Richard S. Gaines, Princeton, N.J., and Chi-Yuan Lee, Berkeley, Calif., assignors to Bell Telephone Laboratories, Incorporated, New York, N.Y., a corporation of New York Filed July 21, 1964, Ser. No. 384,139
Int. Cl. G11b 5/00
U.S. Cl. 340—173 13 Claims

ABSTRACT OF THE DISCLOSURE

An associative memory system including an array of structurally identical storage cells capable of storing information or data and of communicating with adjacent cells. The system provides for the simultaneous shifting of information or data stored in any or all of the cells of the array to adjacent cells in the array.

Figure 1:
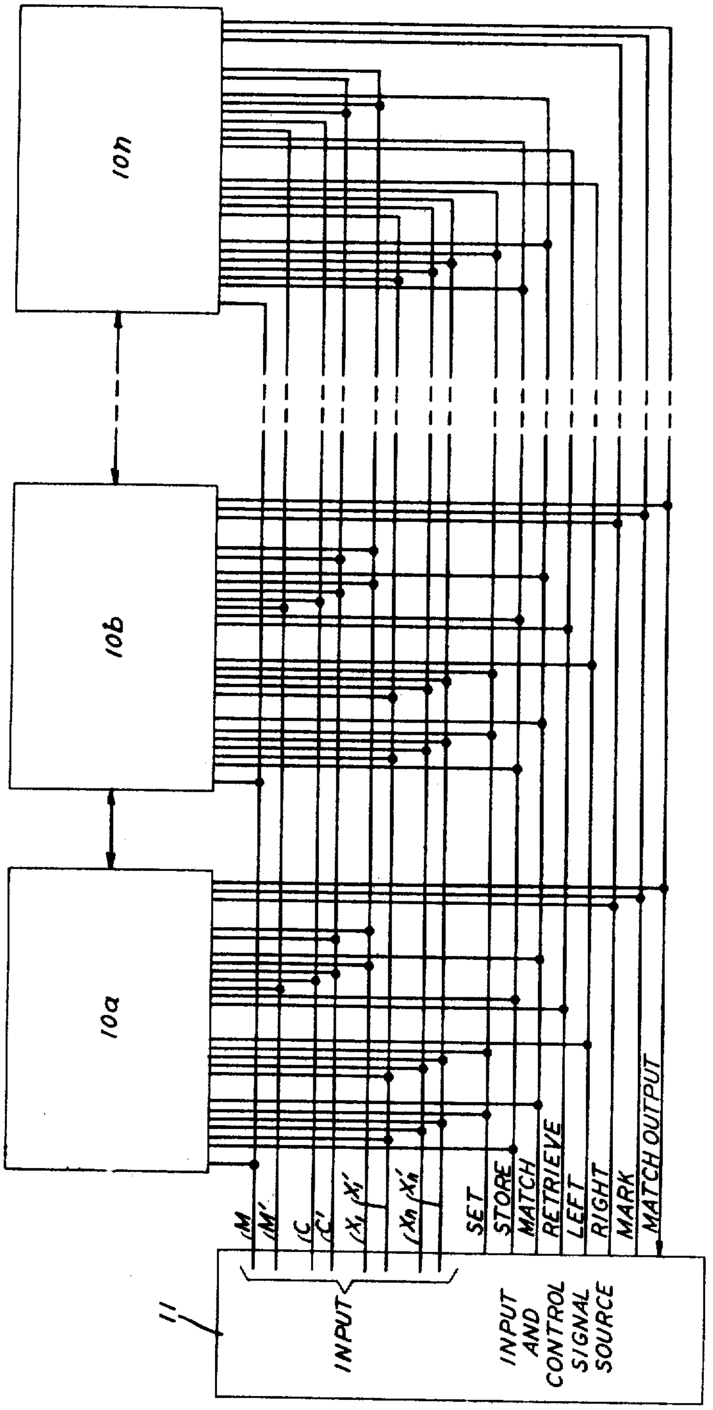

This invention relates to information storage and retrieval systems, and more particularly to such systems in which retrieval is based on content rather than location.

Memory units in current use may be divided into two broad classifications according to the manner of gaining access to the stored information. Some memory units store information at predetermined locations without regard to the particular information being stored. Retrieval is then implemented by addressing a predetermined storage location in the memory. Another type of memory, referred to as associative memory, matches or associates the stored information with retrieval data. Thus, in order to retrieve a stored symbol, a corresponding symbol is applied simultaneously to each storage cell. If a match with a stored symbol is obtained, retrieval of data stored adjacent to the matched symbol may be achieved.

An example of such an associative memory is disclosed in C. Y. Lee application Ser. No. 190,856, filed Apr. 30, 1962 which issued as Patent 3,185,695 on May 25, 1965. In addition to the basic storage and retrieval operations, such a system has the ability to erase data from the memory and to store new data therein irrespective of the number of symbols in a word or the number of words in the messages involved.

The memory disclosed in the aforementioned Lee application has the ability to retrieve a message by applying a group of symbols which correspond to a word stored in only one location in the memory. A group of messages stored at random locations in the memory and each containing a common word which is utilized as an address for retrieving a message from the memory may be retrieved from the circuit disclosed in C. Y. Lee and M. C. Paull application Ser. No. 271,759, filed Apr. 9, 1963 which issued as Patent 3,284,779 on Nov. 8, 1966.

It is an object of this invention to improve the operation of information storage and retrieval systems.

It is another object of this invention to improve the operation of an associative type memory, and more particularly, to increase the flexibility of such systems.

It is a further object of this invention to permit storage and retrieval of messages containing duplicated data in an associative type memory.

These and other objects of the invention are realized in accordance with one specific illustrative embodiment thereof by provision of a memory unit comprising an array of structurally identical storage cells capable of storing a symbol or bit of data and communicating with adjacent cells.

As disclosed in the aforementioned C. Y. Lee and C. Y. Lee et al. applications, symbols are written in the cells sequentially during the storage operation, such that a series of interconnected cells will contain identifying symbols and a succeeding series of interconnected cells will contain data symbols. During retrieval, a symbol is applied simultaneously to each cell in the memory and serves to activate only those cells containing the corresponding symbol. The activated cells in turn prepare adjacent cells to perform the matching function with succeeding input symbols. The process continues until all of the address symbols have been applied in sequence to the memory and matched against the content of active cells.

A retrieval signal applied thereafter to each cell in the memory will trigger each currently active cell, which at this time includes only the first cell in one or more stored words or series of cells containing data symbols. Read out will continue through the successive cells in the activated words thus providing, in parallel form, all of the information identified by the particular address. Advantageously, the process may also be reversed such that the address symbols during retrieval correspond to the stored word. In this instance, upon initiation of the read out operation, the word identifier, activated by the corresponding word matching the address symbols, will be read out.

As further described in the aforementioned applications, information may be retrieved from the memory on a direct basis which presumes that the application of a particular address to the memory will eventually produce an output of the data stored adjacent the last of the group of cells containing the word matching the address. When a match occurs, an advance signal is transmitted from the active cell to activate the adjacent cell. When a data cell receives such an advance signal, it reads out the stored data as well as continuing the propagation of the forward signal to succeeding cells until all of the data identified by the particular address has been retrieved.

It is also possible, through a process referred to hereinafter as cross retrieval, to retrieve a message comprising one or more stored words including the address word. In this instance the activity condition is propagated in either direction during retrieval. The cell structure again is uniform throughout the memory, but a new identifier, referred to hereinafter as a tag symbol, is stored in the memory immediately preceding each word and each message. Thus the tag symbol specifically identifies that a word or multiple word message is stored in succeeding cells, dependent upon the specific tag symbol employed. Also an external comparison circuit is provided which matches the various outputs of the memory against a particular tag symbol, and when a match is encountered in the external comparison circuit, the retrieval operation is completed.

An improvement afforded by the latter cited application concerns a situation in which a particular word is stored at a number of locations throughout the memory as a portion of each of a number of longer messages. It may now be desired to retrieve a message or messages by utiliing this word as the address. This operation is facilitated by a step propagation operation in which the messages containing the aforementioned word are retrieved in sequence. Other operations performed in the memory are the erasure of discrete portions of the stored information and the closure of gaps caused by erasure to permit subsequent storage of new information at one end of the series of memory cells.

All of the foregoing operations, plus several others to be described hereinafter, are accomplished by a unique cell structure in accordance with the instant invention. Basically this structure includes a register device such as a flip-flop for storage of each binary digit or bit of information to be retained by the cell. Thus, for storage of a 10-digit binary number, ten storage or pattern flip-flop would be utilized in a cell. In addition, each cell includes a regsiter device, designated the match flip-flop, for performing a matching operation. Similarly, a control operation is performed in a register device designated the control flip-flop. The presence of these two register devices in each cell permits considerable flexibility in the memory including the ability to shift simultaneously the patterns stored in large groups of cells in scattered parts of the memory. The supplementary circuitry necessary to perform the desired functions in the illustrative embodiment includes propagation leads for transmitting control signals in either direction between adjacent cells and logic gates such as AND and OR circuits to facilitate application of input and control signals to the various flip-flops in each cell.

It is a feature of this invention that an information storage and retrieval system comprise circuitry for permitting the simultaneous shifting of patterns stored in large groups of distinct locations.

It is another feature of this invention that an information storage and retrieval system comprise circuitry for permitting the simultaneous activation of many scattered groups of individual cells throughout the system.

It is a further feature of this invention that an information storage and retrieval system comprise a plurality of individual storage cells, each cell comprising a plurality of pattern register devices, a matching register device, a control register device and associated logic circuitry sufficient in conjunction with externally supplied information and control signals to perform the desired functions of an associative memory.

Figure 2:
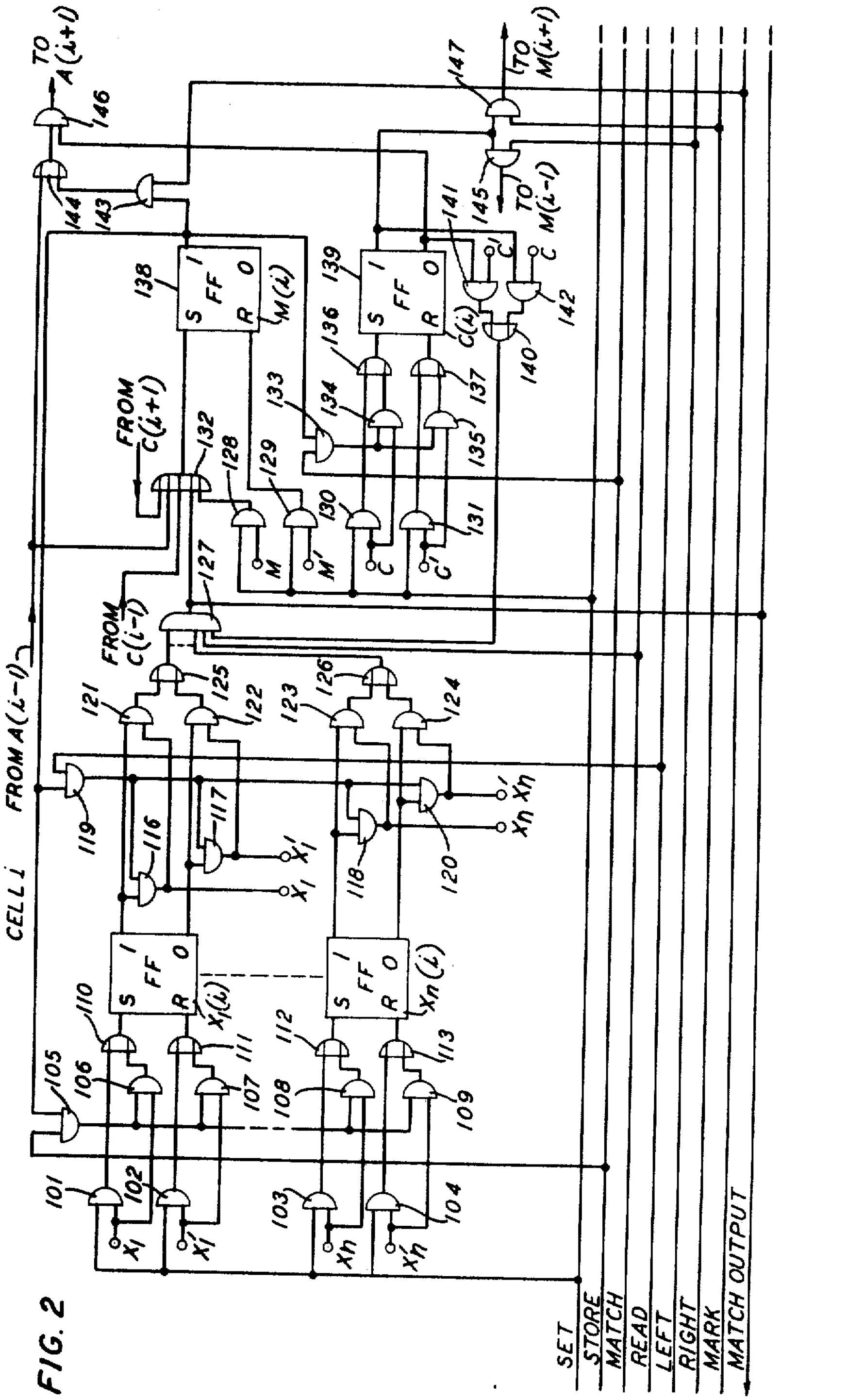

A complete understanding of this invention and of the above-noted and other features thereof may be gained from consideration of the following detailed description, with reference to the accompanying drawing, in which:

FIG. 1 is a simplified block diagram representation of an associative memory suitable for illustration of this invention; and FIG. 2 is a schematic representation of one storage cell in the memory of FIG. 1 depicting in detail the circuitry required to perform all of the operations described in the aforementioned patent applications, plus the simultaneous shift and marking operations in accordance with the specific illustrative embodiment of this invention.

Turning now to the drawing, an arrangement of cells in an associative memory is depicted in FIG. 1. As there shown, the memory comprises a linear array of identical storage cells 10*a*, 10*b*–10*n* connected in parallel to a set of pattern and command leads. Thus the arrangement forms a series network of interconnected cells, with each cell connected to the succeeding and preceding cells in the network chain.

Each cell contains identical circuitry for facilitating storage, matching, propagation and retrieval operations. Signals from an input and control signal source 11 are supplied to each cell over various leads designating the particular operation to be performed; whereupon, the content of each cell is either altered to store new information, compared with matching information, or directed to retrieve information stored therein. The cells are joined by propagate leads and, upon receipt of proper directives, propagate control signals in either direction to activate neighboring cells, thereby placing them in condition for a possible match of their content with the next applied signal. The direction of propagation is determined by signals present on leads designated left and right, which also provide signals to each of the cells 10*a*–10*n*.

When the matching operation is completed, the propagate signals permit activity condition signals to be propagated between adjacent interconnected cells, the direction of propagation being controlled externally.

The match output lead, also connected to each of the cells 10*a*–10*n*, is activated by signals applied to the retrieve cable after the matching operation to permit retrieval of information from those cells which were appropriately primed for retrieval by the intercell activity.

During the retrieval operation, only one of the cells in which a match occurred is permitted to provide an output at any one time. Thus the information present on the input leads, upon appearance of the match output signal, constitutes the desired output information. In this instance, then, distinct output leads are not required.

The particular commands designated in FIG. 1 will be described hereinafter in conjunction with the detailed description of an individual cell, *i*, illustrated in FIG. 2. As there depicted, a cell comprises a plurality of data register flip-flops $X_1(i)$ to $X_n(i)$, the composite states of which comprise the pattern or information content of the cell, a match flip-flop $M(i)$ and a control flip-flop $C(i)$.

Access to the cell is gained via a plurality of control leads, each designated according to the particular control operation which it initiates. Also information is stored in or retrieved from a cell via the input leads which are double rail, i.e., two paths to each register permit designation of the binary "one" or "zero" conditions which serve respectively to set or reset the corresponding register. Double rail operation also permits the memory to ignore particular registers not involved in the current operation. Thus if the pattern in cell *i*, FIG. 2, involves only the first pattern flip-flop $X_1(i)$, each of the remaining pattern flip-flops through $X_n(i)$ would have a binary "one" signal on both of its input leads. The particular configuration of the cell *i* illustrated in FIG. 2 requires that this "don't care" condition be specified by a binary "zero" signal on both input leads for the match flip-flop $M(i)$ and control flip-flop $C(i)$. As these input leads are wired in parallel to very cell in the memory, the same input conditions of course prevail for all cells.

The cells, although indistinguishable from one another in structural elements and their interconnections, are each arranged to store a specific character which designates the beginning or end of a message or word in a message, or which actually comprises a unit of a word. When the character identifies a message or a word, it is referred to as a "tag" symbol. Such tag symbols are necessary to retrieve multiple word messages from the memory when the memory receives as its address only a particular word in the message to be retrieved.

STORAGE

To illustrate the basic functions of the cell memory, initially consider the network of storage cells 10*a*–10*n* in FIG. 1 to be empty and cell *i* illustrated in FIG. 2 to be cell 10*a*, the first cell in the series network. Upon receipt of the STORE command, the memory will store a designated pattern in all active cells, i.e., those cells having the match flip-flop M in the set state. Therefore, in order to precondition the memory to store the first input pattern only in the first cell 10*a*, it is necessary to activate this cell and deactivate all others. This is accomplished by the following sequence of inputs and commands:

| Instruction: | Result |
|---|---|
| (1) SET, M' | Resets all match flip-flops M. |
| (2) SET, C | Sets all control flip-flops C. |
| (3) RIGHT | Shifts activity to the right 1 cell. |
| (4) STORE, C' | Resets control flip-flop C only in active cells. |
| (5) MATCH, C | Sets match flip-flop if control flip-flop in same cell is set. |

The first instruction provides a signal on each of the SET command lead and the M' input lead which cooperate to enable AND gate 129, the output of which resets match flip-flop $M(i)$. An equivalent operation is performed in all other cells in the memory thereby deactivating the entire network. The second instruction applies SET and C signals to the memory which enable AND gate 130 to set control-flip $C(i)$ through OR gate 136. All of the other cells in the memory are similarly affected. The memory is now in condition to activate cells on the right of those cells having the control flip-flop in the SET condition. The signal on the RIGHT control lead combines with the SET output of the control flip-flop $C(i)$ to enable AND gate 147, the output of which sets the match flip-flop $M(i+1)$ through the OR gate 132 in the adjacent cell on the right in the network. At this point all cells with the exception of cell $i$ are active and all control flip-flops are set.

The fourth instruction resets all control flip-flops in active cells, the STORE signal combining with the set output of the match flip-flop to enable AND gate 133, the output of which combines with the C′ input to enable AND gate 135 to reset the control flip-flops through OR gate 137 in the respective cells. Control flip-flop $C(i)$ remains set in that this cell is inactive.

Finally, the fifth instruction applies the C input signal to AND gate 142 which is enabled by the set condition of flip-flop $C(i)$ and its output applied through OR gate 140 to AND gate 127. The latter gate is enabled in conjunction with the MATCH control signal to set flip-flop $M(i)$ through OR gate 132. Thus the final condition of the network preparatory to the storage of information therein finds the first cell in the network, and only that cell, in the active state.

The pattern desired to be stored in the first cell of the memory is now applied to the input leads together with the STORE control signal. Considering cell $i$, FIG. 2, to be the first cell in the network, the set output of match flip-flop $M(i)$ is applied to AND gate 105 in conjunction with the signal on the STORE control lead, thereby providing an input to AND gates 106–109 in the pattern storage circuitry. These inputs, coupled with the pattern input signals received from the input and control signal source 11, enable the appropriate ones of the AND gates 106–109 to set or reset the corresponding pattern flip-flops $X_1(i)$–$X_n(i)$ through OR gates 110–113 so as to establish the desired pattern in cell $i$. The set output of match flip-flop $M(i)$ also is applied to AND gate 133 in conjunction with the signal on the STORE control lead. The output of AND gate 133 enables AND gate 134 in conjunction with a signal on the C input lead so as to set control flip-flop $C(i)$ through OR gate 136.

At this juncture, the instruction "STORE, pattern, C" has placed the memory in a condition in which the only active cell $i$ has the desired pattern stored therein and the control flip-flop $C(i)$ set. An input on the M′ lead and the SET control lead thereupon enables AND gate 129 to reset the match flip-flop $M(i)$. The next instruction "RIGHT" serves to activate the succeeding cell 10*b*, or $i+1$, by the application of a signal on the RIGHT control lead which, coupled with the set output of control flip-flop $C(i)$, enables AND gate 147 to set the match flip-flop in cell $i+1$ through its corresponding OR gate 132. Finally, a signal on the C′ input lead and SET control lead serves to reset control flip-flop $C(i)$ via AND gate 131 and OR gate 137. The memory now finds cell 10*b* $(i+1)$ to be the only active cell; whereupon, a new pattern of input signals applied to the memory will be stored only in the pattern flip-flops of that cell. This set of instructions, recapitulated hereinafter, continues to store the desired pattern in each cell of the memory in sequence:

| Instruction: | Result |
|---|---|
| (1) STORE, pattern, C | Stores pattern and sets control flip-flop in active cells. |
| (2) SET, M′ | Inactivates all cells. |
| (3) RIGHT | Activates cell to right of one having control flip-flop set. |
| (4) SET, C′ | Resets all control flip-flops. |

Let us assume that the following information is to be applied to the empty network of cells 10*a*–10n:

| Position | 1 | 2 | 3 | 4 | 5 | 6 | 7 | 8 | 9 | 10 | 11 | 12 | 13 |
|---|---|---|---|---|---|---|---|---|---|---|---|---|---|
| Character | $\alpha_0$ | $\alpha_1$ | A | $\beta$ | $\alpha_2$ | B | $\beta$ | $\alpha_3$ | C | $\beta$ | $\alpha_0$ | $\alpha_1$ | D |

| Position | 14 | 15 | 16 | 17 | 18 | 19 | 20 | 21 | 22 | 23 | 24 | 25 |
|---|---|---|---|---|---|---|---|---|---|---|---|---|
| Character | $\beta$ | $\alpha_2$ | B | $\beta$ | $\alpha_0$ | $\alpha_1$ | B | $\beta$ | $\alpha_2$ | E | $\alpha_2$ | $\beta$ |

Each character represents a unique binary number stored, for example, in a plurality of flip-flop register circuits, as described in the aforementioned C. Y. Lee and C. Y. Lee et al. applications. The character $\alpha_0$ is a tag indicating the beginning of a message; the characters $\alpha_1$, $\alpha_2$ and $\alpha_3$ are tags indicating the beginning of distinct words; the character $\beta$ is a tag indicating the end of a word. The words in the three messages contained in this input information are represented by ABC, DB and BE. Each of the words is preceded by the appropriate tag $\alpha_1$, $\alpha_2$, $\alpha_3$, and succeeded by the tag $\beta$. Similarly, each message is preceded by the tag $\alpha_0$.

Initially, the cells storing the corresponding characters are each in a passive state. Of course, the words themselves may take up a number of cells, but for this illustration it will suffice to identify each word with only one cell position. Upon completion of the storage operation, the designated symbols will appear in the same sequence in the series network of storage cells 10*a*–10*n*, all of which will be placed in a passive state. Thus the network would appear as illustrated in the example, in which condition it is prepared for the matching operation, which is the first step in the retrieval of any message from the network given one of the message words.

MATCHING

At this point let us consider, for purposes of illustration, that it is desired to retrieve the multiple character word designated by the letter D in position 13. Since there is actually no prior knowledge as to which cells contain this word, it must be identified by applying each of its symbols and appropriate tags in sequence to all of the network cells, viz., $\alpha_1$, D, $\beta$. Initially, then, all of the cells receive the tag $\alpha_1$ and are required to match their content against it.

The memory is now in condition to receive the input pattern, in this instance $\alpha_1$, for which a match is desired. Thus the input leads receive the pattern $\alpha_1$ and the MATCH control signal is applied. The input pattern $\alpha_1$ is received at one input of each of the AND gates 121–124, together with the output of each of the pattern flip-flops $X_1$–$X_n$, as stored in each individual cell. Where a match occurs, all of the input leads to AND gate 1 27 via the OR gates 125–126 corresponding to a matched pattern will be energized.

In like fashion, the MATCH control signal input energizes another input lead to AND gate 127. With all inputs energized, AND gate 127 is enabled to provide an output signal on the MATCH OUTPUT SIGNAL control lead and the corresponding match flip-flop is set via OR gate 132.

The next step in the program requires the setting of the control flip-flop in each of the active cells, viz., those cells having the match flip-flops in the set condition. For this purpose the C input lead and the STORE control lead are activated. The set output of the match flip-flop together with the STORE control signal, enables AND gate 133, the output of which, together with the C input, enables AND gate 134. The result is the setting of the control flip-flops via OR gate 136. The memory at this juncture will have both match and control flip-flops in the set condition only in those cells containing the matching pattern. All other cells will have these flip-flops in the reset condition.

The next step in the process is to reset all match flip-flops. For this purpose the M′ input and the SET control leads are energized, resulting in the enablement of AND gate 129 to reset the match flip-flop. Following this action, the previous activity condition is shifted one cell to the right by energizing the RIGHT control lead. This serves to enable AND gate 147 together with the set input of the control flip-flop. The output of AND gate 147 serves to set the match flip-flop in the succeeding cell $i+1$ of the series network via its corresponding OR gate 132.

The condition of the memory is now such that cells in which a match occurred have the match flip-flop reset and the control flip-flop set, while the adjacent cell on the right has the match flip-flop set and the control flip-flop reset. The desired situation preparatory to the next match input pattern, in this instance D, is to have the control flip-flop set and the match flip-flop reset only in those cells in which it is desired to perform the matching operation, viz., those cells adjacent to the cells in which a match has just been detected. Thus the next step in the program is to again reset all control flip-flops, as previously described, followed by the setting of the control flip-flops in the currently active cells, viz., those having the match flip-flop in the set condition.

Having completed this operation in the manner previously described, all match flip-flops are again reset, and the memory is in condition to receive the new pattern D for matching against the pattern stored in each cell. In this instance the input leads designating the appropriate pattern D, the C input lead, and the MATCH control lead are energized. In those cells storing the matching pattern and having the control flip-flop in the set condition, the AND gate 127 will be enabled to once again provide a signal on the MATCH OUTPUT SIGNAL control lead and to set the match flip-flop.

The following table recapitulates the foregoing description of the matching operation:

| Instruction: | Result |
|---|---|
| (1) MATCH, pattern. | Sets match flip-flop **138** (activates cell) and provides match output signal if a match is present. |
| (2) STORE, C | Sets control flip-flop **139** only in active cells. |
| (3) SET, M' | Resets all match flip-flops **138**. |
| (4) RIGHT | Shifts activity to the right 1 cell. |
| (5) SET, C' | Resets all control flip-flops **139**. |
| (6) STORE, C | Same as No. 2. |
| (7) SET, M' | Same as No. 3. |
| (8) MATCH, pattern, C. | Same as No. 1. |

(9) Repeat instructions 2–8 for all subsequent required match instructions.

(10) Upon receipt of the last MATCH instructions stop after step No. 5.

READ OUT

The foregoing matching operation prepares the memory for a subsequent read out operation by activating the cell storing the first character of a word desired to be read out. It is possible that a number of words stored in widely scattered portions of the memory have satisfied the matching requirements and would be read out during a subsequent read out operation. However, for the read out operation to work properly, there must be only one active cell in the memory at the outset such that the stored words may be read out in sequence. For this purpose the following instructions are supplied to the memory:

| Instruction: | Result |
|---|---|
| (1) SET, C' | Resets all control flip-flops **139**. |
| (2) MARK | All cells following the leftmost active cell in the memory are activated. |
| (3) STORE, C | Sets control flip-flop **139** in each active cell. |
| (4) SET, M' | Resets all match flip-flops **138**. |
| (5) RIGHT | Shifts previous activity to right 1 cell. |
| (6) STORE, C' | Resets control flip-flops **139** in all active cells. |
| (7) SET, M' | Same as No. 4. |
| (8) MATCH, C | Sets match flip-flop **138** in those cells in which the control flip-flop **139** is set. |

After this sequence of instructions has been executed, the leftmost active cell, if any, will be the only active cell. The new instruction included in this operation is MARK. Appearance of a signal on the MARK control lead enables AND gate 143, FIG. 2, in each cell having the match flip-flop in its set condition, which in turn enables AND gate 146 through OR gate 144 in those cells having the control flip-flop in the reset condition. The output of AND gate 146 serves to set the match flip-flop in the next succeeding cell through the corresponding OR gate 132 and is propagated to succeeding cells to set the match flip-flop therein until a cell is reached which contains a control flip-flop in the set condition, at which point the propagation ceases. The net result is the activation (setting of the match flip-flop) of each cell between the leftmost active cell and the first succeeding cell having the control flip-flop in the set condition.

The memory is now in condition to begin the read out operation. This is performed merely by applying a signal to the READ control lead and detecting the pattern present on the input leads. This result is permitted through the enabling of AND gate 119 by the READ signal in conjunction with the set output of the match flip-flop. The output of AND gate 119 then combines with the outputs of the pattern flip-flops $X_1(i)$–$X_n(i)$ to enable the appropriate AND gates 116–120.

Following read out of the pattern stored in the leftmost active cell, the activity is propagated one cell to the right in the manner previously described and the read out operation is repeated. Read out of the next character $\beta$ in the instant example will indicate that the end of the desired word has been reached, and the read out operation will cease unless additional words in other parts of the memory have satisfied the match criterion, in which case these words will now be read out in sequence. In order to permit this multiple read out, it is necessary that the memory retain some means for identifying the cells which were active before read out of the leftmost word. In accordance with this invention, the unique cell configuration of FIG. 2 permits the use of one of the pattern bits for this purpose. For example, the bit stored in the first pattern flip-flop $X_1(i)$ may be utilized for this purpose. The instructions necessary to accomplish this result are SET, $X_1'$ and STORE, $X_1$. The first instruction will serve to reset all pattern flip-flops in the memory. The second instruction permits the STORE command to enable AND gate 105 together with the set output of the match flip-flop in all active cells. The output of AND gate 105, together with the $X_1$ input signal, enables AND gate 106 to set the pattern flip-flop $X_1(i)$ through OR gate 110.

This operation is performed immediately following the matching operation when each cell storing the character beginning each word to be read out of the memory is active. Thus, upon completion of this operation, each such active cell will have the corresponding pattern flip-flop $X_1$ in the set state. Subsequently, when it is desired to read out the second word, a matching operation is performed utilizing $X_1$ as the only positive input in the pattern. This will serve to once again activate all of those cells which had previously stored the set condition on the corresponding pattern flip-flop $X_1(i)$.

PATTERN SHIFTING

Due to the unique ability of the cell configuration in accordance with this invention to utilize the pattern flip-flops for marking cells upon which a subsequent operation is to be performed, as well as for the storage of the pattern characters, it is possible to propagate a multibit pattern from one cell to another at will. This property is valuable, for example, in instances where information is erased from scattered portions of the memory and it is desired to store new information in the memory. It is a simple matter with this shifting operation to fill the gaps produced by the erasure of information to permit the writing of new information at the end of an unbroken series of memory cells containing previously stored multibit patterns.

A simple illustration of this operation is to consider only one active cell in the memory and that it is desired to shift the pattern stored in this and all succeeding cells to the left by one cell. For this purpose one of the pattern flip-flops, e.g., flip-flop $X_1(i)$, is used to indicate which cells contain a pattern to be shifted. Having so designated the cells to be acted upon, succeeding instructions in the operation facilitate the transfer of the pattern in the designated cells one bit at a time.

Initially the memory is put in proper condition for the shifting operation by resetting all control flip flops, performing the MARK instruction whereby all cells following the active cell are also activated, and storing the set condition in pattern flip-flop $X_1(i)$ of all active cells. The memory is now in condition to begin the bit-by-bit transfer of the pattern stored in each of the active cells one cell position to the left. For this purpose the following sequence of instructions is performed, with $X_j$ representing any one of the pattern flip-flops $X_2$ through $X_n$:

| Instruction: | Result |
|---|---|
| (1) SET, M′, C′ | Resets all match and control flip-flops **138**, **139**. |
| (2) MATCH, $X_1$ $X_j$ | Activates cell if the desired match is present. |
| (3) STORE, C, $X'_j$ | Sets control flip-flop **139** and resets the X, pattern flip-flop in all active cells. |
| (4) SET, M′ | Deactivates all active cells. |
| (5) LEFT | Activates the next cell to the left of a cell having the control flip-flop **139** set. |
| (6) STORE, $X_j$ | Sets the $X_j$ flip-flop in all active cells. |

This sequence serves to shift the condition of the pattern flip-flop $X_j$ one cell to the left from each cell in which the pattern flip-flop $X_1$ is set. Repetition of this series of instructions $n-1$ times will serve to shift all of the pattern bits in each marked cell. As this shift occurs simultaneously in all active cells, irrespective of the number of cells involved, the entire operation is completed rapidly.

It is to be understood that the above-described arrangements are illustrative of the application of the principles of the invention. Numerous other arrangements may be devised by those skilled in the art without departing from the spirit and scope of the invention.

For example, by utilizing the marking capability of the memory, error correction during retrieval may be accomplished on a selected group of stored words located in widely separated parts of the memory. Successive input characters of a name are matched with the cell patterns and two of the pattern flip-flops are used to mark the corresponding names stored in the memory. At the conclusion of the matching operation, the cell storing the last name character to be matched will have the two marking pattern flip-flops in the set condition if the input information matches the cell content exactly. If one of the two marking pattern flip-flops in this cell is reset, it means that the match has been obtained with one error. Similarly, if both marking pattern flip-flops are reset, two errors have been encountered in the matching operation.

When the matching operation is completed, the memory first looks for perfect matches which it then proceeds to read out. Failing to find a perfect match, the information stored with a name varying from the matching input name by a single character will be retrieved. By proper manipulation of the cell states, simple programs for correcting errors involving missing or extraneous letters, multiple misspellings, et cetera, may be devised.

Simulation of the error correction operation provided some interesting results. The names of the fifty states of the Union and their capitols were stored in the cell memory. In response to the question "What is the capitol of *Wyoing*" the information retrieved from the memory was "Cheyenne," as expected. Again, in response to the question "What has as its capitol *Columber*" two answers were provided, viz, Ohio and South Carolina.

What is claimed is:

1. An associative memory comprising a plurality of identical cells, each of said cells having a plurality of registers for storing an information pattern, means for comparing stored information with applied match information, a match register for storing an active indication upon the occurrence of a match between said stored information and said match information, and a control register for propagating active indications and information patterns between adjacent cells, and means for applying signals simultaneously to each of said cells.

2. A memory comprising a plurality of storage cells, means for comparing stored information with applied match information, means for activating one of said cells in response to a match between said stored information and said match information, means for storing an information pattern in said active cell, means for applying a sequence of control signal groups to said memory, each signal group being applied simultaneously to each of said cells, and means in said active cell responsive to receipt of said sequence of control signal groups for shifting the activity condition to an adjacent cell.

3. A memory comprising a plurality of identical cells each capable of storing an information character, means for designating the beginning and end of each of a plurality of multicharacter messages stored in various areas of the memory, means for activating all of the cells containing said characters concurrently comprising means for applying a control signal simultaneously to each of the cells in said memory, and means for performing a simultaneous transfer of a portion of the content of each of said active cells to an adjacent cell.

4. A memory comprising a plurality of cells each capable of storing a multibit information pattern, means for applying signals simultaneously to each of said cells designating a sequence of information patterns, means for activating a sequence of said cells containing the corresponding sequence of input patterns, and means in each of said cells for indicating the number of variations from exact correspondence between the stored and applied sequences of information patterns.

5. A memory in accordance with claim 4 wherein each of said cells comprises a plurality of registers, each of which is arranged to store one bit of an information pattern, said indicating means comprising certain of said pattern registers.

6. An associative memory comprising a plurality of identical cells, each of said comprising means for storing a distinct information pattern, means for comparing stored information patterns with applied match information, means for storing an active indication upon the occurrence of a match between said stored information patterns and said match information, means operative in conjunction with said active indications for propagating active indications and information patterns concurrently among more than two of said cells, and means for applying predetermined combinations of input and control signals simultaneously to each of said cells to store information in said memory and to retrieve information from said memory.

7. An associative memory in accordance with claim 6 wherein said pattern storing means comprises a plurality of information element registers, and said propagating means comprises a control register.

8. In an associative memory comprising a plurality of identical cells, each of said cells having a plurality of registers for storing an information pattern, a match register for indicating the cell activity condition and a control register for propagating activity conditions and information patterns between adjacent cells, and means for applying signals simultaneously to each of said cells, the process of activating a single one of said cells comprising the steps of resetting said match registers, setting said control registers, transferring the state of each control register to the match register in an adjacent cell, resetting said control register in each cell having the match register set, and setting the match register in each cell having the control register set.

9. In an associative memory comprising a plurality of identical cells, each of said cells having a plurality of registers for storing an information pattern, a match register for indicating the cell activity condition and a control register for propagating activity conditions and information patterns between adjacent cells, and means for applying signals simultaneously to each of said cells, the process of storing information in said memory comprising the steps of applying an information pattern simultaneously to each cell, setting the control register and the pattern registers in an active cell in accordance with the applied pattern, resetting the match register in each cell, transferring the condition of each control register to the match register in an adjacent cell, and resetting each control register.

10. In an associative memory comprising a plurality of identical cells, each of said cells having a plurality of registers for storing an information pattern, a match register for indicating the cell activity condition and a control register for propagating activity conditions and information patterns between adjacent cells, and means for applying signals simultaneously to each of said cells, the process of matching information patterns applied simultaneously to each cell in the memory against information patterns previously stored in the memory comprising the steps of applying an information pattern to said memory, setting the match register in those cells in which a matching pattern is stored, setting the control register in each active cell, resetting the match registers, transferring the state of each of said control registers to the match register in an adjacent cell, resetting the control registers, setting the control registers in all active cells, resetting the match registers, and repeating the foregoing steps until all input patterns have been utilized.

11. In an associative memory comprising a plurality of identical cells, each of said cells having a plurality of registers for storing an information pattern, a match register for indicating the cell activity condition and a control register for propagating activity conditions and information patterns between adjacent cells, and signal leads for applying input and control signals to said memory, the process of retrieving one of a plurality of messages satisfying the applied matching information patterns from the memory upon completion of a matching operation comprising the steps of resetting the control registers, activating all cells following the first active cell in the memory, setting the control registers in all active cells, resetting the match registers, transferring the state of the control registers to the match register in an adjacent cell, resetting the control registers in active cells, resetting the match registers, setting the match registers in cells in which the control register is set, applying a READ control signal to the memory, and detecting the information pattern present on the input signal leads.

12. In an associative memory comprising a plurality of identical cells, each of said cells having a plurality of registers for storing an information pattern, a match register for indicating the activity condition and a control register for propagating activity conditions and information patterns between adjacent cells, and means for applying signals simultaneously to each of said cells, the process of transferring a selected portion of an information pattern stored in a first cell to an adjacent cell comprising the steps of resetting the match and control registers, transferring the state of a selected pattern register to the match register in the same cell, resetting the selected pattern register in each cell, setting the control registers in all active cells, resetting the match registers, transferring the state of the control registers to the match register in an adjacent cell, and setting the selected pattern register in each active cell.

13. A memory comprising a plurality of identical cells, each of said cells comprising means for storing a distinct information pattern, means for comparing stored information patterns with applied match information, means for storing an active indication upon the occurrence of a match between said stored information patterns and said applied information, means comprising a control register operative in conjunction with said active indication for propagating active indications between adjacent cells and means for setting said control register, and means for simultaneously storing active indications in all cells between each cell having an active indication stored therein and the first following cell having said control register in a set condition.

References Cited

UNITED STATES PATENTS 3,141,153 7/1964 Klein ............ 340—173

TERRELL W. FEARS, Primary Examiner

U.S. Cl. X.R.

340—172.5